Oct. 5, 1965     W. S. STERLING     3,209,888
ARTICLE HANDLING AND ORIENTING APPARATUS
Filed Feb. 13, 1962     4 Sheets-Sheet 1

INVENTOR.
Walter S. Sterling
BY Robert H. Churchill
ATTORNEY

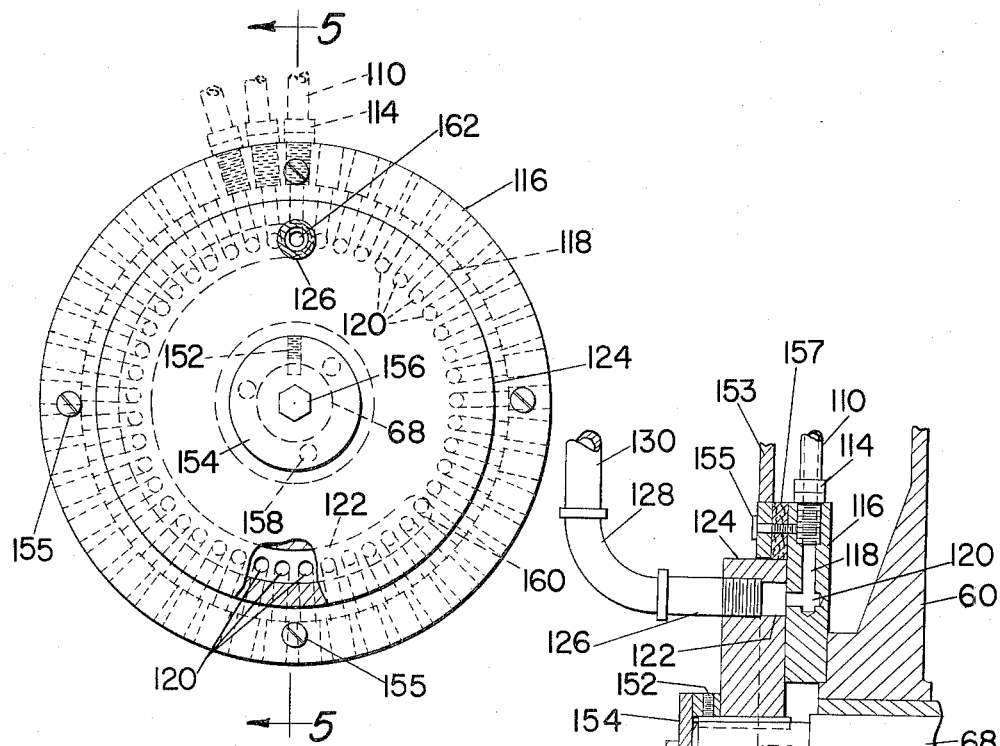
Fig.4
Fig.5
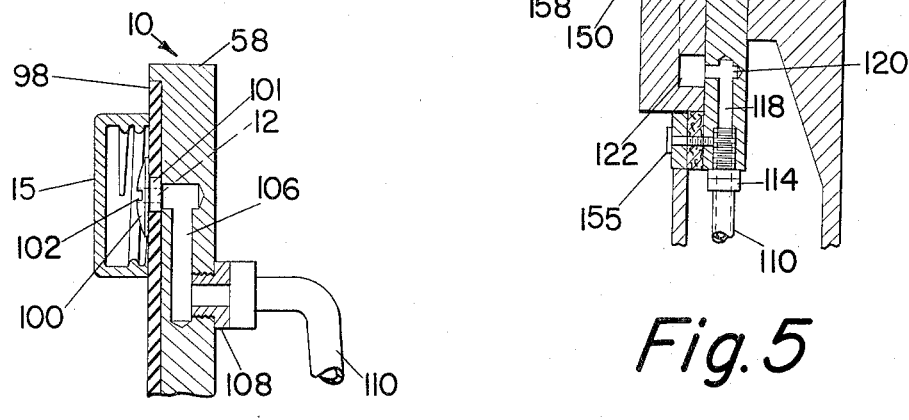
Fig.6
INVENTOR.
Walter S. Sterling
BY Robert F. Churchill
ATTORNEY

United States Patent Office 3,209,888
Patented Oct. 5, 1965

3,209,888
ARTICLE HANDLING AND ORIENTING
APPARATUS
Walter S. Sterling, Quincy, Mass., assignor to Pneumatic Scale Corporation, Limited, Quincy, Mass., a corporation of Massachusetts
Filed Feb. 13, 1962, Ser. No. 173,023
4 Claims. (Cl. 198—33)

This invention relates to article handling and orienting apparatus.

The invention has for an object to provide novel and improved article handling and orienting apparatus adapted to withdraw articles from a bulk supply thereof and to deliver the articles in an oriented position into a feed chute for delivery to other instrumentalities in a simple and efficient manner.

Another object of the invention is to provide novel and improved apparatus of the character described which is particularly adapted for handling and orienting generally cylindrical hollow articles open at one end, such as screw cap closures or the like, in a gentle and superior manner.

A further object of the invention is to provide novel and improved apparatus of the character specified which is capable of handling and orienting different sizes, shapes and diameters of such articles without adjustment or changes in the apparatus.

A still further object of the invention is to provide a novel and improved method of and apparatus for handling and orienting articles of the character specified wherein suction is utilized for withdrawing and orienting articles from a bulk supply thereof and for transferring the oriented articles into a feed chute in an efficient and superior manner.

With these general objects in view and such others as may hereinafter appear the invention consists in the article handling and orienting apparatus and in the various structures, arrangements and combinations of parts hereinafter described and particularly defined in the claims at the end of this specification.

In the drawings illustrating the preferred embodiment of the invention:

FIG. 4 is a detail view in front elevation of a suction or vacuum distributing head forming a part of the pneumatic means to be referred to;

FIG. 5 is a vertical cross section taken on the line 5—5 of FIG. 4; and

FIG. 6 is a cross sectional detail view taken on the line 6—6 of FIG. 1.

In general the present invention contemplates an article handling and orienting machine adapted for handling cylindrical hollow articles open at one end and, as illustrated herein, the invention is embodied in a closure handling and orienting apparatus for use in connection with the feeding mechanism of a closure applying machine or other instrumentality wherein it is desired to deliver the closures or other articles in a line and oriented to face in the same direction. Provision is made in the present apparatus for withdrawing closures at random from a bulk supply thereof by pneumatic means, herein shown as a rotary suction disk or conveyor, arranged to rotate in a substantially vertical plane. The rotary disk is provided with a plurality of suction openings in its outer face, and a supply hopper supported at the lower end of the disk is arranged to present some of the randomly arranged closures against the face of the disk. In operation those closures in the bulk supply which are arranged with their open ends facing flat against the disk will be drawn by suction into adhering engagement with the face of the disk by an adjacent suction opening, and those closures which present any other portion than the open end thereof will remain in the hopper until they assume a position with their open ends against the disk. During the continuous rotation of the disk the closures retained by the disk will be withdrawn from the hopper and carried to the upper end of the disk where they are released and guided into the upper end of a feed chute in an oriented position for delivery to the feeding mechanism. In operation the randomly arranged closures in the hopper are in relatively loose frictional engagement with the face of the rotary suction disk, and provision is made for stirring or jostling the closures to change the position thereof until they assume a position to be withdrawn by the suction disk.

In accordance with the present invention the illustrated article handling and orienting apparatus for handling hollow articles, and particularly hollow cylindrical articles open at one end, is characterized by its capability of handling a wide range of different sizes, shapes and diameters of such articles without the necessity of making any mechanical changes or adjustments in the apparatus to suit a particular article being handled.

Figure 1:
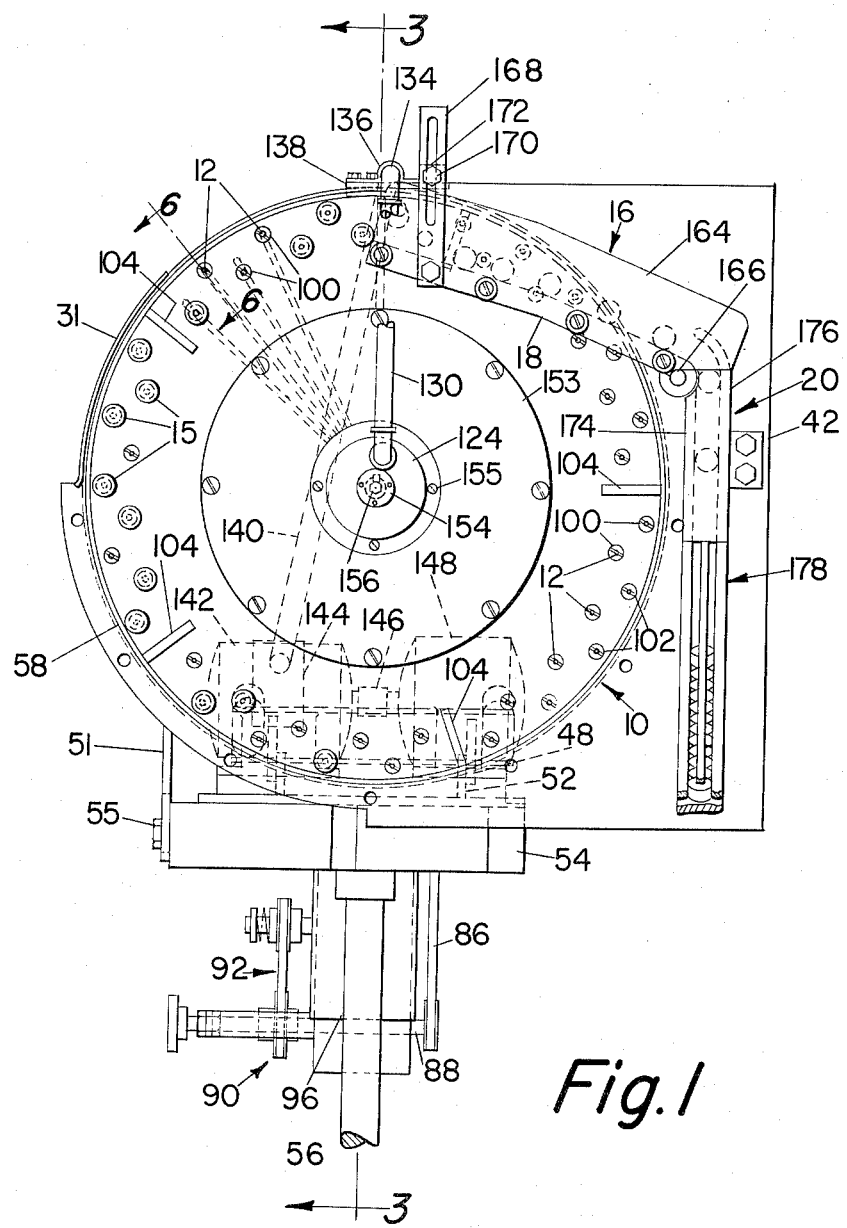
FIG. 1 is a front elevation of closure handling and orienting apparatus embodying the present invention, the supply hopper being removed.
Figure 2:
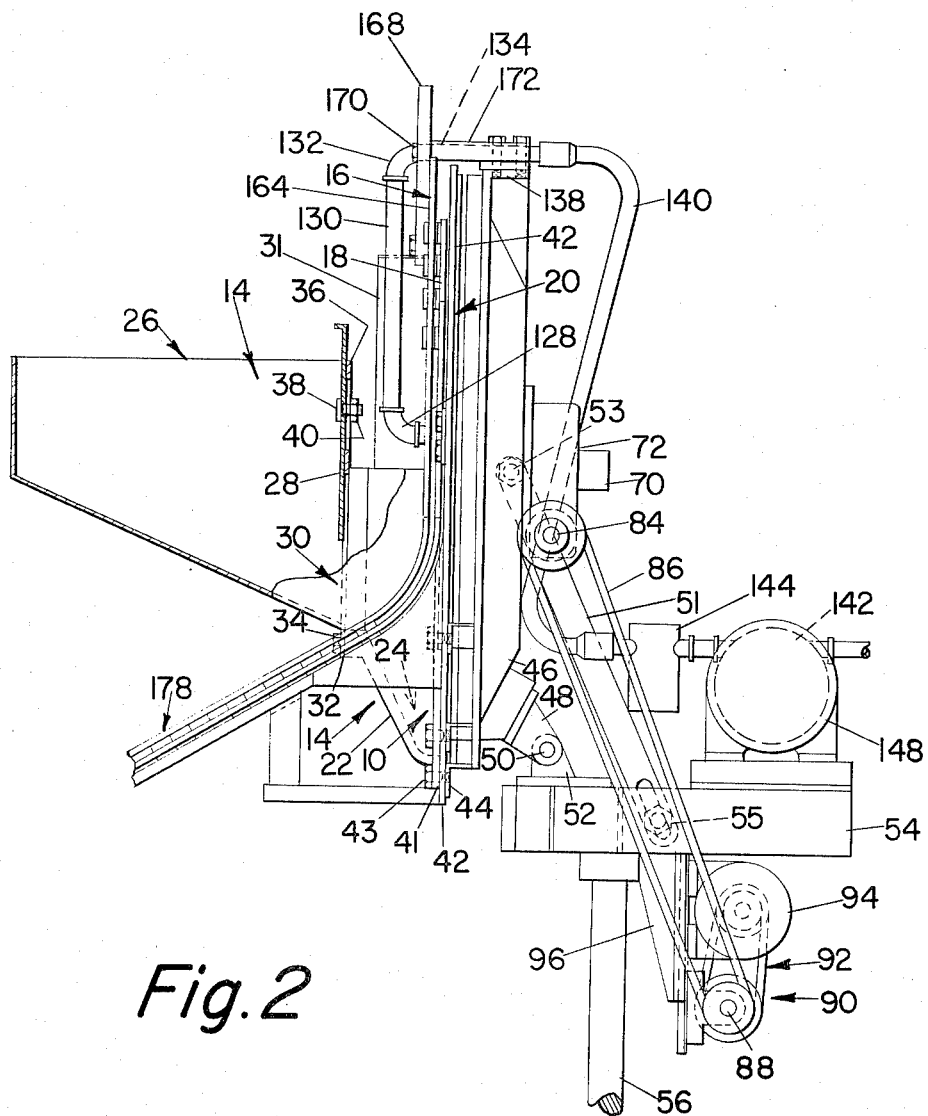
FIG. 2 is a side elevation of the same showing the supply hopper partly in cross section.

Referring now to the drawings, and particularly to FIGS. 1 and 2, in general the present article handling and orienting apparatus is illustrated as embodied in a closure handling machine which includes a rotary disk or annular plate 10 which may be defined as a conveyor mounted to rotate in a substantially vertical plane and provided with a plurality of suction openings 12 in the face thereof. A supply hopper indicated generally at 14 is supported adjacent the lower end of the disk 10 to present the randomly arranged closures 15 against the lower portion of the suction face of the disk as shown. The disk 10 is provided with two concentric circular rows of relatively small suction openings 12 along the marginal portion of the disk, the openings in one row being staggered with relation to the openings in the second row, and those closures in the supply hopper which happen by chance to assume a position with their open ends in engagement with the face of the disk are drawn into adhering engagement therewith by an adjacent suction opening moved into operative relation to a closure to be withdrawn from the supply and carried upwardly to the upper end of the disk. At the upper end of the disk the retained and oriented closures are carried into a guide chamber 16 having an inclined bottom rail 18 at which point the suction is discontinued to release the oriented closures which fall onto the inclined rail and roll by gravity into the open end of a closure feed chute indicated generally at 20.

As herein shown, the hopper 14 includes an arcuate hollow cast member 22, substantially semicircular in shape, having an inclined side wall which forms with the substantially vertical face of the rotary disk 10 a tapering trough 24 open at the top as shown in cross section in FIG. 2. The hopper further includes a sheet metal extension comprising a main supply portion 26 having an inclined bottom wall and from which the closures deposited into the open upper end of the main supply portion 26 may flow by gravity into the trough. In order to limit the gravitational feed of the closures into the trough so as to maintain the closures in the trough in a relatively loose condition capable of freely changing their positions relative to each other and to the suction disk 10, a vertically adjustable plate 28 is provided between the trough portion 22 and the main supply portion 26 providing an adjustable opening 30. In operation the plate 28 serves to hold back the pressure of the closures in the main supply, and the opening 30 may be adjusted to permit gravitational release of additional closures into the trough as the closures therein are reduced upon withdrawal of closures from the trough by the suction disk 10. As herein shown, a curved guard plate 31 is extended arcuately from the upper left hand side of the semicircular hopper 14 to prevent inadvertent escape of unoriented or non-suction held closures which might be supported by and ride up with those closures retained on the disk by suction. Such non-suction held closures will eventually drop off and fall by gravity into the bulk supply.

As herein shown, the main portion 26 of the supply hopper is provided with a flange 32 connected to the trough portion 22 by bolts 34. The plate 28 may be adjustably supported in a slotted tie piece 36 by bolts 38 and nuts 40. The arcuate trough portion 22 is provided with a flange 41 at its inner end which is placed against a facing plate 42 and connected by bolts 43 to one leg of an arcuate angle member 44 as shown in FIG. 2. The outer face of the plate 42 may be substantially flush with the outer face of the annular disk 10 and is cut out to provide clearance for rotation of the disk. The plate 42 extends from the right hand side of the disk and provides a support for the upper end of the feed chute 20 as shown in FIG. 1. The other leg of the angle member 44 is connected to the rim of a cylindrical housing 46. The housing 46 is provided with a hinge bracket 48 at its lower end which is pivotally mounted on a shaft 50 carried by a bracket 52 secured to a platen 54. The platen 54 is mounted on a supporting post 56 which may be supported for vertical adjustment in a base member not shown. In order to support the housing 46 in a substantially vertical plane an elongated bar 51 pivotally connected at one end to an intermediate portion of the housing on a stud 53 is slotted at its other end and adjustably secured to a side wall of the platen 54 by a bolt 55. It will be apparent that the housing may rock on its pivot 50 to effect adjustment thereof in a vertical or slightly inclined position, and the bolt 55 may be tightened to retain the housing in its adjusted position.

Figure 3:
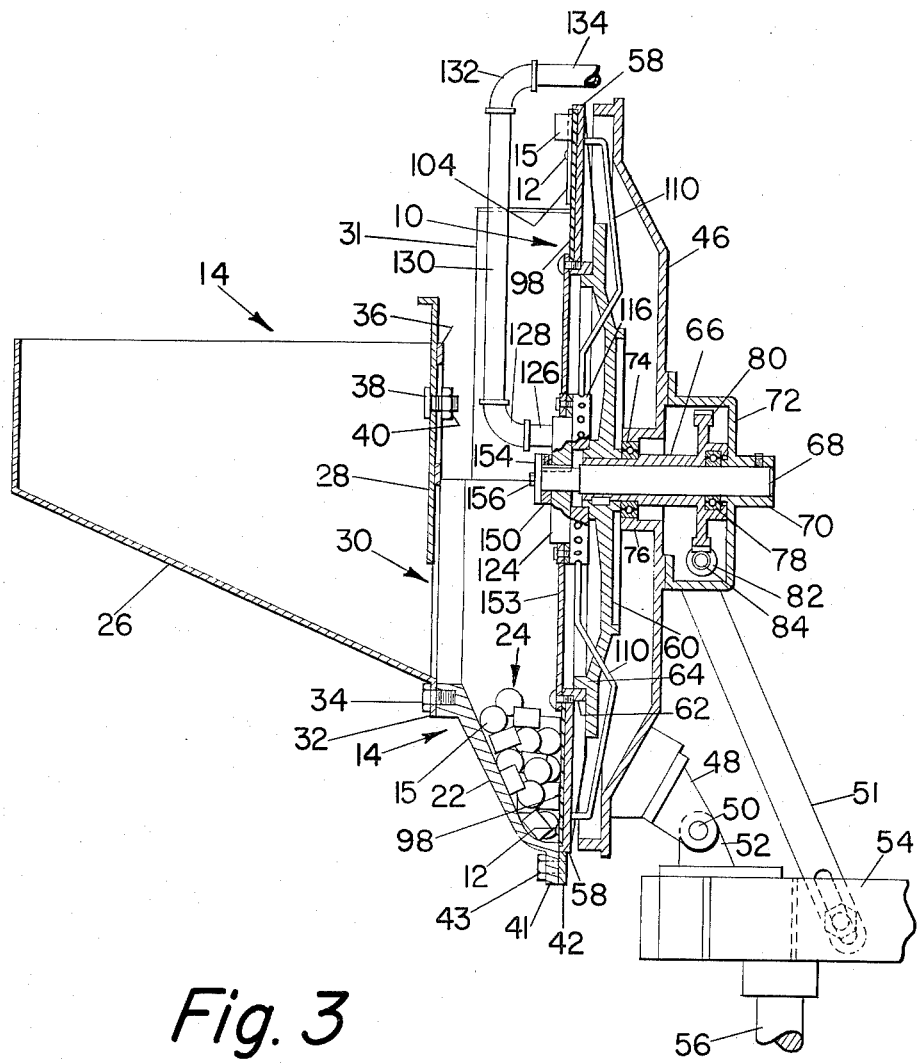
FIG. 3 is a vertical cross section taken on the line 3—3 of FIG. 1.

The suction disk 10, herein illustrated as supported for rotation in a vertical plane, as shown in cross section in FIG. 3, includes an annular plate 58 in which the suction openings are formed and a supporting disk 60. The annular plate 58 is provided with a flange 62 extended inwardly from its inner periphery and which is fitted over and secured to an outwardly extended flange 64 of a supporting disk 60. The disk 60 is keyed to a driving sleeve 66 which is mounted to rotate on a stationary shaft 68. The shaft 68 is supported in a hub 70 of a gear box 72 secured to the housing 46. The sleeve 66 is supported for rotation by a ball bearing 74 carried by an inwardly extended hub portion 76 of the housing and by a ball bearing 78 carried by the sleeve and mounted on the shaft 68. A worm gear 80 is formed integrally with the sleeve 66 and is in mesh with a worm 82 fast on a shaft 84 mounted in the gear box 72. The shaft 84 is connected by a belt and pulley drive 86 to a shaft 88 forming a part of a variable speed drive unit indicated generally at 90 and which includes a belt and pulley drive 92 to a motor 94. The motor 94 and variable speed unit 90 are supported for adjustment in a bracket 96 secured to and depending from the platen 54.

Referring now to FIG. 6 which shows a closure 15 in adhering engagement with the disk 10, it will be observed that the annular plate portion 58 of the suction disk is provided with a resilient facing 98 which may comprise a relatively soft rubber sheeting or like resilient material adhesively or otherwise secured to the face of the plate 58. In operation, when a suction opening is moved into alignment with the open end of a closure facing the disk, the air in the closure will be evacuated, and the rim of the closure will be drawn into engagement with the resilient facing. The advantage of employing a resilient facing on the suction disk is that it will compensate for any irregularities or defects in the rim of the closure such as might form a passageway for air when using a rigid or solid disk, the resilient facing 98 serving to effectively seal such passageways so as to successfully retain the closure in adhering engagement with the disk.

In order to assure that no closures will be picked up by the suction openings other than those closures which present their open ends to the disk, the disk is provided with a rounded projection 100 about each suction opening. The opening passes through the center of the projection, and the projection is further provided with a diametral vent slot 102. In operation any closure which presents any surface other than the open end thereof, such as the flat closed end or the curved side wall of the closure, will fail to be retained by the suction opening since the relatively small suction opening in the rounded projection thus engaged will be vented by the diametral slot 102. However, a rounded projection passing through the trough 24 will engage and lift one edge of the rim of a closure which presents its open end against the disk, and as the edge of the closure passes over the rounded projection it will be lowered onto the resilient facing 98 to cover the projection. In practice the closure is gently urged against the disk by the surrounding loosely arranged mass of closures in the trough. When the rim of the closure is fully seated on the resilient facing 98 the suction will retain the closure against the disk as described.

In operation the disk 10 is rotated relatively slowly so as to afford gentle handling of the loosely arranged closures, and those closures in engagement with the disk which do not face in an oriented direction are caused to turn relative to each other by frictional engagement with the face of the disk and also by engagement with those closures caused to adhere to the disk and which pass through the loosely arranged closures in the trough during withdrawal therefrom. In order to further cause the closures to change their positions in the trough with relation to each other and to cause some and eventually all of the closures to turn about and face in an oriented direction as a condition incidental to their movement relative to each other and to the suction disk, a plurality of radially extended, elongated and circumferentially spaced stirrer bars 104 are secured to the annular suction disk 10 for gentle frictional engagement with those closures which bear against the face of the disk. The stirrer bars may comprise metal bars and may extend a short distance outwardly from the face of the disk, as shown, so that in operation the closures in the trough are gently jostled about to change their positions. Unoriented closures which may be engaged and carried upwardly by the stirrer bars will fall off by gravity from the substantially vertical face of the suction disk to be returned to the mass of closures in the trough 24. It will be evident that the tapering shape of the arcuate trough urges the mass of closures in the trough against the face of the suction disk.

As illustrated in FIG. 6, the rounded projections 100 in which the suction openings 12 are formed may be provided with stem portions 101 which extend through the resilient facing 98 and are connected to the annular plate 58 in communication with radial passageways 106 formed in the plate. The radial passageways are connected to a source of air at a reduced pressure as will now be described.

As illustrated in FIGS. 3, 5 and 6, air at reduced pressure is connected to each suction opening 12 through the radial passageways 106 formed in the disk, and nipples 108 in communication with the passageways and extended from the rear face of the annular plate 58 are connected by flexible pipes 110 to radially extended nipples 114 carried by a central rotary valve member 116. The rotary valve member 116 is carried by and rotatable with the rotary supporting disk 60 and is provided with radial passageways 118 which communicate with laterally extended spaced ports 120. The spaced ports 120 are formed in a circle and are arranged to cooperate with an arcuate chamber 122 formed in a stationary valve member 124. The valve member 124 is slidably keyed to a reduced diameter extended portion of the stationary shaft 68. A pipe nipple 126 in communication with the arcuate chamber 122 is connected by an elbow 128 to an upstanding pipe 130 which in turn is connected by an elbow 132 to a horizontally extended pipe 134. The pipe 134 is connected by a pipe clamp 136 to a plate 138 secured to the top of the housing 46 as shown in FIGS. 1 and 2. A flexible pipe 140 connects the pipe 134 to a vacuum pump 142 which is provided with a conventional filter 144. The pump 142 is connected by a coupling 146 to an electric motor 148. The pump and motor are mounted on the platen 54.

As illustrated in FIG. 5, the reduced diameter extended end of the shaft 68 is provided with a collar 150 which bears against the stationary valve member 124 to prevent displacement thereof. The collar 150 is provided with a set screw 152 which engages the key as shown. The end of the shaft 68 is further provided with an end disk 154 secured thereto by a central screw 156. In order to cause the slidably mounted valve member 124 to bear firmly against its cooperating valve member 116 in airtight relation, the collar 150 is further provided with a plurality of through openings for receiving coil springs 158 interposed between the end disk 154 and the valve member 124. As shown in FIG. 5, a felt ring 157 is fitted around the stationary valve member 124 and is secured to the rotary valve member 116 by an annular retaining member and screws 155. An annular cover plate 153 is secured at its outer edge to the inner marginal edge of the annular suction plate 58 by screws as shown in FIG. 3. The inner marginal edge of the cover plate abuts the outer periphery of the retaining member 151 as shown. A vent opening 159 extended through the stationary valve member 124, collar 150 and end disk 154 is provided to vent the chamber 161 to the atmosphere whereby to relieve any vacuum created therein by inadvertent leakage between the valve members.

As shown in FIG. 4, the arcuate chamber 122 in the stationary valve member 124 extends from a point 160, about 45° from the vertical in the lower right hand side of the circular valve member, to a point 162 coinciding substantially with the vertical center line at the upper end of the valve member. As a result, the ports 120 of the rotary valve member 116 enter into communication with the arcuate chamber at point 160 just as the suction openings 12 enter the trough 24 in engagement with the randomly arranged closures. Thereafter, those closures which are oriented and aligned with the suction openings and are retained by the suction disk are carried upwardly to the top of the disk 10 at which point the suction is cut off by movement of the valve ports 120 beyond the point 162 to release the closures. At this time the closures have entered the guide chamber 16 which is defined by the inclined bottom rail 18 and a side wall 164 carried by the rail 18. The other side of the chamber is defined by the face of the annular disk 58 and the flush outer face of the supporting plate 42. The bottom rail 18 may be relatively narrow and spaced from the face of the disk 58, the lower end of the rail being pivotally connected to a stud 166 carried by the plate 42. The upper end of the inclined bottom rail 18 is supported for vertical adjustment by a slotted bar 168 connected by a bolt 170 to a support 172 secured to the plate 138 as shown in FIG. 1.

In operation, when the oriented closures are released from the suction disk 10 they will fall by gravity onto the inclined rail 18 with their closed ends supported against the side wall 164 and their open ends facing the suction disk 58. The relatively narrow rail 18 supports the outer edge of the closures, and the rim of the open end of the closures is supported against the face of the disk, sufficient clearance being provided to enable the closures to roll freely down the inclined rail and into the upper end of the feed chute 20. The feed chute 20 includes a stationary rail 174 and an adjustable rail 176 supported by the plate 42 and, further, includes an extended portion 178 from which the accumulated closures may be withdrawn by the machine being served, such as a closure applying machine.

In operation the relatively slowly rotating suction disk will pick up only those closures which happen by chance to face with their open ends against the disk and past which a suction opening is moved and aligned. Thus, in practice the number of closures withdrawn from the trough and released into the feed chute each cycle of rotation of the suction disk is variable. However, a sufficient number of closures are withdrawn from the trough during the continuous rotatation of the suction disk to maintain the feed chute supplied with enough closures to keep up with the withdrawal rate from the delivery end of the chute. In practice it has been found that when handling and orienting different groups of widely varying sizes and shapes of closures a substantial number of the closures in the randomly arranged and continuously changing group inherently assume an oriented position with their open ends against the face of the disk so that every second or third suction opening in the disk picks up an oriented closure which is wholly adequate to maintain a sufficient number of closures in the feed chute. In practice the speed of rotation of the suction disk may be varied by virtue of the variable speed driving mechanism 90 to suit the variable rate of pickup for different types and sizes of closures and to suit the withdrawal rate from the delivery end of the feed chute.

While the invention has been illustrated and described herein as particularly adapted for handling and orienting closures it will be apparent that other hollow cylindrical articles open at one end may be handled in the present apparatus. Also, while the continuously movable transferring or conveying element is herein preferably shown as comprising a rotary disk provided with a plurality of suction openings and arranged to rotate in a substantially vertical plane, it will be understood that the present invention also contemplates apparatus wherein the suction disk is arranged to rotate in a substantially horizontal plane. It will also be understood that in its broader aspects the invention contemplates other forms of continuously moving transferring or conveying elements, such as a continuously moving conveyer belt having suction openings therein in communication with a suction chamber and against which a randomly arranged supply of such articles is caused to engage and turn until they assume an oriented position such as to be withdrawn from the supply.

Having thus described the invention, what is claimed is:

1. In apparatus for handling and orienting hollow articles open at one end, a conveying element having a plurality of suction openings in communication with a source of vacuum, means for supporting a supply of randomly arranged articles in engagement with the conveying element, those articles oriented to face with their open ends against said conveying element and aligned with a suction opening being retained thereby to be withdrawn from the supply, and means carried by said conveying element and associated with said suction openings for preventing withdrawal of articles other than those articles oriented to face with their open ends against said conveying element.

2. In apparatus for handling and orienting hollow articles open at one end, a conveying element having a plurality of suction openings in communication with a source of vacuum, and means for supporting a supply of randomly arranged articles in engagement with the conveying element, those articles oriented to face with their open ends against said conveying element and aligned with a suction opening being retained thereby to be withdrawn from the supply, said conveying element being provided with a plurality of rounded projections in which the suction openings are formed and over which the open ends of the articles are aligned to be retained by the conveying element.

3. In apparatus for handling and orienting hollow articles open at one end, a conveying element having a plurality of suction openings in communication with a source of vacuum, and means for supporting a supply of randomly arranged articles in engagement with the conveying element, those articles oriented to face with their open ends against said conveying element and aligned with a suction opening being retained thereby to be withdrawn from the supply, said conveying element being provided with a plurality of rounded projections in which the suction openings are formed and over which the open ends of the articles are aligned to be retained by the conveying element, said rounded projections having a vent slot whereby to avoid retention by the suction openings of those articles in other than an oriented position.

4. In apparatus for handling and orienting hollow cylindrical closures open at one end, a rotary conveyor disk mounted to rotate in a substantially vertical plane and having a plurality of suction openings, a source of vacuum and connecting means in communication with said suction openings, a hopper including a main supply portion and a trough portion for supporting a supply of randomly arranged closures against the face of said disk at the lower end thereof, an adjustable plate between the main supply portion and the trough for limiting the gravitational flow of closures from the main supply portion whereby to maintain the articles in the trough in a relatively loose condition capable of changing their positions relative to each other and to the disk, those closures in the trough oriented to face with their open ends against said disk and aligned with a passing suction opening being retained thereby to be withdrawn from the supply and carried around to the upper end of the disk, stirrer means carried by the disk and engageable with the closures to cause the same to change their positions in the trough, the engaging face of said disk comprising a resilient material, said disk being provided with a plurality of convex projections in which the suction openings are formed, each projection having a vent slot to avoid retention of closures in other than an oriented position, the open ends of said oriented closures covering said projections and engaging the resilient facing material in airtight relation, and a feed chute disposed at the upper end of the disk for receiving the oriented articles upon release thereof from the conveying element.

References Cited by the Examiner
UNITED STATES PATENTS
2,991,909  7/61  Lamazon _____ 221—211

SAMUEL F. COLEMAN, *Primary Examiner.*

EDWARD A. SROKA, *Examiner.*